April 12, 1960     F. SOLOMON     2,932,681

BATTERY ELECTROLYTE CIRCULATION DEVICE

Filed Dec. 27, 1955

INVENTORS
FRANK SOLOMON
BY
*J. B. Burke*
ATTORNEY

United States Patent Office 2,932,681
Patented Apr. 12, 1960

2,932,681

BATTERY ELECTROLYTE CIRCULATION DEVICE

Frank Solomon, Great Neck, N.Y., assignor to Yardney International Corp., New York, N.Y., a corporation of New York Application December 27, 1955, Serial No. 555,486

3 Claims. (Cl. 136—160)

This invention relates to art of electric storage batteries and particularly concerns a novel device for circulating electrolyte liquor in a storage battery. The invention is especially applicable to batteries which contain a very limited supply of electrolyte.

In electric storage battery operation the condition is commonly encountered wherein the supply of electrolyte is gradually withdrawn from certain electrodes, of one polarity enclosed in envelopes of separators semi-permeable to the electrolyte, and separated thereby from electrodes of opposite polarity during charge or discharge of the battery. One type of battery in which this condition is encountered employs positive silver oxide electrodes and negative zinc electrodes, and the separators therebetween are formed of organic sheet material such as cellophane, e.g. as described in U.S. Patent Nos. 2,594,709—2,594,714. The assembly of positive and negative electrodes and separators are immersed in electrolyte liquor. The negative electrodes are directly exposed to free electrolyte and the positive electrodes are enclosed in semi-permeable envelopes saturated with aqueous alkaline electrolyte. During charging of the battery the electrolyte liquor is gradually withdrawn from the positive electrodes. In many batteries only a limited quantity of electrolyte is available so that withdrawal of a substantial amount of electrolyte from any electrode adversely affects operation of the battery. It is necessary to provide a means to restore the electrolyte liquor to these electrodes in a simple and efficient manner to obtain maximum capacity and efficiency of the battery.

It is therefore a principal object of the invention to provide a circulation device for an electrolyte liquor in a battery.

It is a further object to provide a novel irrigation device for a storage battery where the quantity of available electrolyte is extremely limited. It is a further object to provide a well within a battery casing wherein is disposed an electrolyte circulation device.

It is a further object to provide a storage battery with a fluid operated bladder for circulating electrolyte.

Other and further objects and advantages of the invention will become apparent from the following description taken together with the drawing wherein.

Figure 1:
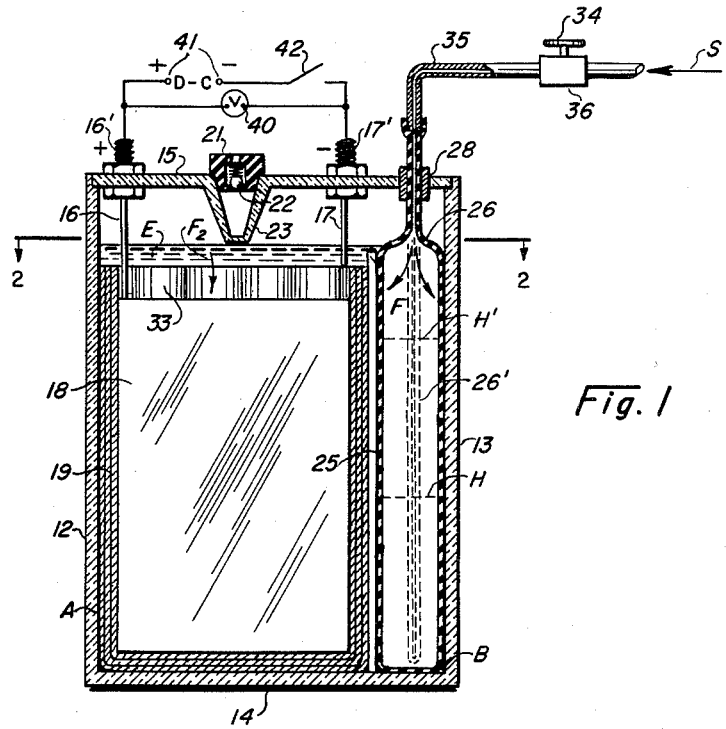
Fig. 1 is an elevational sectional view of a battery embodying the invention.
Figure 2:
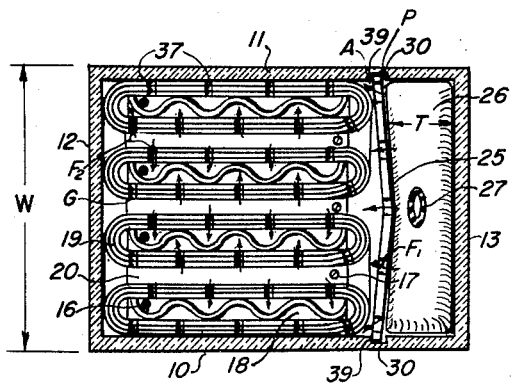
Fig. 2 is a cross sectional view taken on lines 2—2 of Fig. 1.

In Figs. 1 and 2 are shown a substantially rectangular casing having side walls 10, 11, 12, 13, a base 14, and a top 15. The casing is formed of a suitable non-conductive material. Within the casing is disposed a plurality of rectangular plates 18, 20. The plates 18 are positive electrodes which may be silver oxide. The plates 20 are negative electrodes which may be zinc. Connected to these electrodes are conductors 16 and 17 respectively. The conductors 16 terminate in a common positive battery terminal 16'. The conductors 17 terminate in a common negative terminal 17'. Terminals 16' and 17' are located on the top plate 15 of the casing. A vent chamber 23 is formed in the top plate 15 and has a vent cap 21 mounted therein. The cap 21 has a spring biased valve member 22 which permits one way travel of gas out of the vent chamber 23 but prevents entry of gas into the casing.

Each of the positive electrodes 18 is wrapped in an envelope of semi-permeable sheet material 19. This wrapping mechanically isolates each positive electrode so wrapped from the adjacent negative electrode. Since the wrapping is semi-permeable and readily wetted by the electrolyte liquor it permits the electrolyte E to readily wet the wrapped electrode.

The separator envelope 19 extends a short distance above each electrode in order to prevent the deposit of zinc crystals thereover which would otherwise short-circuit the electrode plates.

The separator material is wrapped in a roll and the axis of the roll is bent in the form of a U so that each arm of the U is an envelope containing one positive electrode 18. Along the top of each separator envelope is a plurality of recesses 37. A non-conductive corrugated member 33 is disposed along the top of each positive electrode and extends at least to the top edge of the separator envelope. This member provides grooves G by which free electrolyte liquor may enter the enclosure formed by the envelope of the positive electrode, via the recesses 37 as shown by arrows F2. The negative electrodes 20 are disposed in alternation with the positive electrodes 18 with the separator material 19 therebetween.

The entire assembly of electrodes and separator mateial is held under pressure between the walls 10, 11 of the casing. This pressure is developed by swelling of the separator material in the electolyte liquor.

In walls 10 and 11 are grooves 30, 30' in which is inserted a partition or panel 25. This panel extends from a point just above the base 14 to the top of the adjacent separator envelopes 19. This panel is spaced from wall 13 a distance T and defines therewith a deep narrow well B. The panel also defines the battery chamber A with walls 10, 11, 12 in which are disposed the electrodes and separators. The panel is generally U or V-shaped being bowed at the center so that the panel does not touch the envelopes 19.

Within the well B is disposed a bladder 26 which is shown in a collapsed condition by dotted lines 26'. The bladder terminates in a neck 27 which passes through a collar 28. A pipe 35 is attached to the neck 27 of the bladder. This pipe is provided with a valve 36 having a control handle 34 and is supplied with compressed gas from a suitable source S.

Normally the well B will contain a very limited quantity of electrolyte liquor which will not extend above the level H in the well B when the bladder is collapsed.

For purpose of charging the battery a charging source 41 is connected in series with a switch 42 across the terminals 16' and 17'. While the battery is being charged, the level of the electrolyte liquor gradually rises from level H to a level H' in the well B. This is caused by passage of the electrolyte liquor away from the enclosures of the positive electrodes 18 and into the portion of the chamber A where the negative electrodes are exposed to the free electrolyte E. The free electrolyte in the chamber A enters well B around the ends of panel 25 through the narrow passages P provided by grooves 30, 30'. There is also a passage provided by an aperture (not shown) near the bottom of the panel where it is supported on the base 14.

When the electrolyte reaches level H' indicating substantial withdrawal of liquor from the relatively isolated positive electrode enclosure, the charging current from a D.C. charging source 41 may be cut off by opening switch 42, and the valve 36 may then be opened to cause a gas to enter the deflated bladder 26.

The point in the charging cycle when the critical level H' of electrolyte liquor has been reached may be shown by a substantial rise in the indication of voltage by voltmeter 40 connected across the terminals 16', 17'. Another indication of when the bladder should be inflated to expel electrolyte liquor into the positive compartment is the observation of gassing from the vent cap in battery cover 15.

When the gas enters the bladder 26 is expands and causes the panel 25 to close the ends of the well B by pressing the panel against the sides 39 of slots 30, 30'. The electrolyte pours over the top of the well as indicated by arrows F.

When the electrolyte entering chamber A over the top of panel 25, rises to the tops of the separators 19 it pours over into the enclosures for the positive electrodes as indicated by arrows $F_2$. The corrugated spacer members 33 located at the opening of the separator envelopes keep the enclosures open to flow of free electrolyte via the grooves G. If the members 33 were not present the upper ends of the separators would close and prevent access of the electrolyte liquor to the electrodes. The scallops 37 at the tops of the separators even out the flow of liquor to all portions of the electrodes. The bladder thus provides a means of effectively circulating the limited amount of electrolyte liquor in the casing as needed. After the free electrolyte has been expelled from the well B the bladder may be collapsed to the initial dotted line position shown in Fig. 1. If this bladder collapse is accomplished under a suction a drop in pressure occurs to withdraw bubbles of gas from the electrode-separator interfaces. The expelling of gas from chamber A by the creation of a low pressure in the chamber has a beneficial effect on the operation of the battery. The removal of gas or bubbles which escape as the pressure is lowered in chamber A and B increases the area of electrodes exposed to electrolyte and decreases the internal resistance of the battery cell. The efficiency of the electrochemical reaction between electrodes and electrolyte is thus increased.

After restoration of the electrolyte liquor to the positive electrode enclosure the charging of the battery may be continued.

Generally the electrolyte liquor passes from the positive electrode enclosures 19 during charge of the battery. The restoration of the electrolyte by means of the bladder should be performed before an excessive amount of electrolyte has been withdrawn from the positive electrode enclosures to insure maximum charge of the battery during the charging cycle. It has been noted that the electric storage capacity of the battery may be increased from 200–300% by use of the electrolyte circulation means provided herein.

It will be noted that the circulation means is relatively simple and requires no moving parts. If necessary it may be operated by lung power instead of mechanical pumping means. Since the battery is intended for operation with the electrodes and separator materials under pressure, the disposition of the bladder in a separate well restrained on its expansion by panel 25, and the bowed configuration of the panel prevents interference with the pressure relationship between electrodes and separators.

The panel 25 and members 33 should be made of some non-conductive material such as plastic. Suitable materials are phenolic resins which are not attacked in the alkaline electrolyte generally used in this type of battery. The bladder 26 should be made of flexible material such as polyethylene which also is not attacked in a strong alkaline electrolyte such as an aqueous solution of potassium hydroxide.

In a battery of the type described space is generally too limited for provision of any electrolyte circulation means. The present invention makes use of a very narrow space and is adapted for use in batteries of any practical height and width. The partition 25 in operation serves in effect as a valve member permitting one way flow of electrolyte through the passages between chambers A and B. When the bladder expands it blocks the lower opening between the chamber at the base of the partitions and forces the partition against sides 39 in grooves 30, 30' to seal the passages P so that the free electrolyte can only be expelled over the top of the partition as shown by arrows $F_1$.

The dimensions of the well chamber B in relation to the dimensions of the electrode chamber A are shown only diagrammatically in the Figs. 1 and 2. Actually the well chamber is extremely long and narrow in relation to the electrode chamber, as it must be in order to provide for a substantially complete displacement of a very small amount of electrolyte liquor from the bottom of the well to the top of the separator envelopes. As an example, in a battery wherein the chamber A is 60" x 12" x 3", the well chamber B may be 60" x ½" x 3", and the height of the electrolyte in the well chamber may be only 6 inches when the bladder is in the collapsed condition.

What is claimed is:

1. An electrochemical battery comprising a casing containing an electrolyte, a partition forming a first and a second chamber in said casing, said electrolyte being present in both of said chambers, at least one electrode of one polarity and at least one electrode of the opposite polarity in said first chamber, semi-permeable separator means between said electrodes forming around at least one of said electrodes an envelope open at the top above the normal level of the electrolyte, said partition forming a restricted passage for electrolyte from said first chamber to said second chamber, and a fluid-actuated expansible member in second chamber operable to expel some of said electrolyte from said second chamber to said first chamber, thereby raising the electrolyte level in said first chamber above the top of said envelope.

2. A battery according to claim 1, further comprising spacer means at the top of said envelope enabling access of electrolyte to the enclosed electrode.

3. A battery according to claim 2, wherein said spacer means comprises a corrugated element.

References Cited in the file of this patent

UNITED STATES PATENTS

| 1,383,411 | Longstreet | July 5, 1921 |
| 2,529,511 | Murphy | Nov. 14, 1950 |
| 2,584,117 | Elrod | Feb. 5, 1952 |

FOREIGN PATENTS

| 1,126,430 | France | Nov. 22, 1956 |